123,024

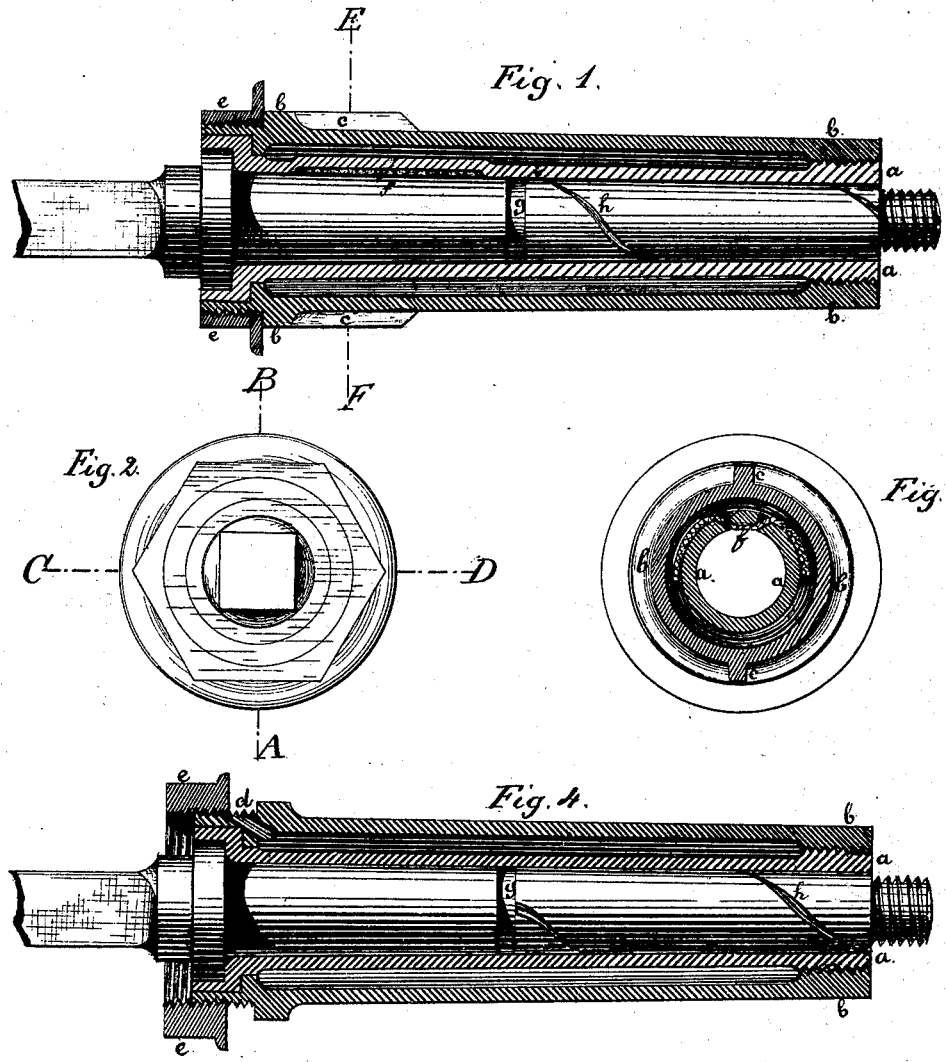

UNITED STATES PATENT OFFICE.

FRIEDRIK KEIFEL, OF CINCINNATI, OHIO.

IMPROVEMENT IN LUBRICATING JOURNALS.

Specification forming part of Letters Patent No. 123,024, dated January 23, 1872.

I, FRIEDRIK KEIFEL, of Cincinnati, in the county of Hamilton, State of Ohio, have invented a new kind of Grease-Boxes for Carriages, Buggies, and Spring-Wagons, of which the following is the specification:

My invention relates to a grease-box applied to the wheels of carriages, buggies, and spring-wagons. This box, which only greases the axle when the wheel is turning, is able to contain such a quantity of grease or oil as to last for about two months, and can be filled without moving the wheel from the axle.

In the accompanying drawing, Figure 1 is a vertical section through the grease-box in the direction A B, Fig. 2. Fig. 2 is a side elevation of the box, with the axle seen from the inside of the vehicle. Fig. 3 is a vertical section through the box in the direction of E F. Fig. 4 is a horizontal section through the box in the direction of C D.

General Description.

The grease-box, made of iron, consists of two conical parts, $a$ and $b$, screwed together at the smaller end tight enough to close them at the same time at the broader end, so that no oil or grease of any kind that may be used can get out. In this manner these two conical pieces $a$ and $b$ inclose a hollow space all around the axle containing the grease or oil, filled by the canal $d$ when the nut $e$ is screwed out as far as in Fig. 4. When the box is filled this nut $e$ is screwed tight on $b$, toward the wheel-nave, covering the opening of the canal $d$. The whole box $a$ and $b$ together is fastened from behind the nut $e$ till the other end is tight as possible, forced to turn with the wheel by means of two wedge-shaped pieces, $c$, set on $b$, as shown in Figs. 1 and 3.

The grease or oil closed up in the box is led to the axle by means of a wick, $f$, shown in Figs. 1 and 3. This wick $f$ is fastened by being drawn through two slits in the conical piece $a$, as shown in Fig. 3, and through this wick the oil or grease will be drawn continually to the axle when the wheel is turning.

To distribute the grease or oil lengthwise over the axle there is a cut, $g$, turned in around the axle to take up the grease or oil, and from there a cut, $h$, in form of a very stretched screw, leads the oil or grease around the axle till near to the end.

I claim as my invention—

The combination of the parts $a$ and $b$, held together by screw-threads at the points, and by the nut $e$ at the other ends, forming an oil-box having an opening, $d$, adapted to an axle having a groove, $h$, and to the use of a wick, $f$, all constructed and arranged as and for the purpose set forth in the foregoing specification.

FRIEDRIK KEIFEL.

Witnesses:
  CH. KEIFEL,
  FR. HEINBRÜCHEL.